INVENTORS
Richard A. Jerue
Allen N. Sweeny
BY
Harness, Dickey & Pierce
ATTORNEYS

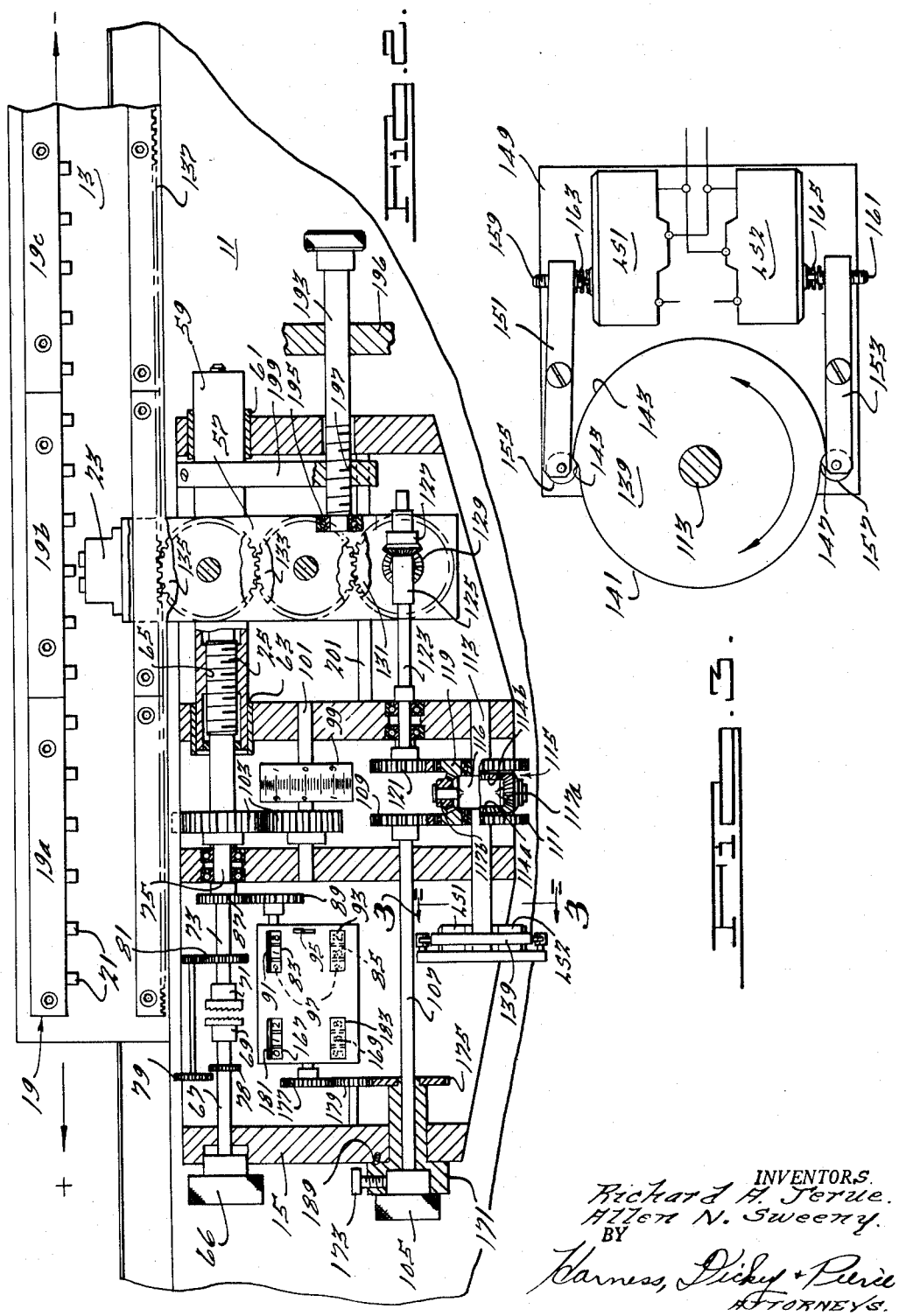

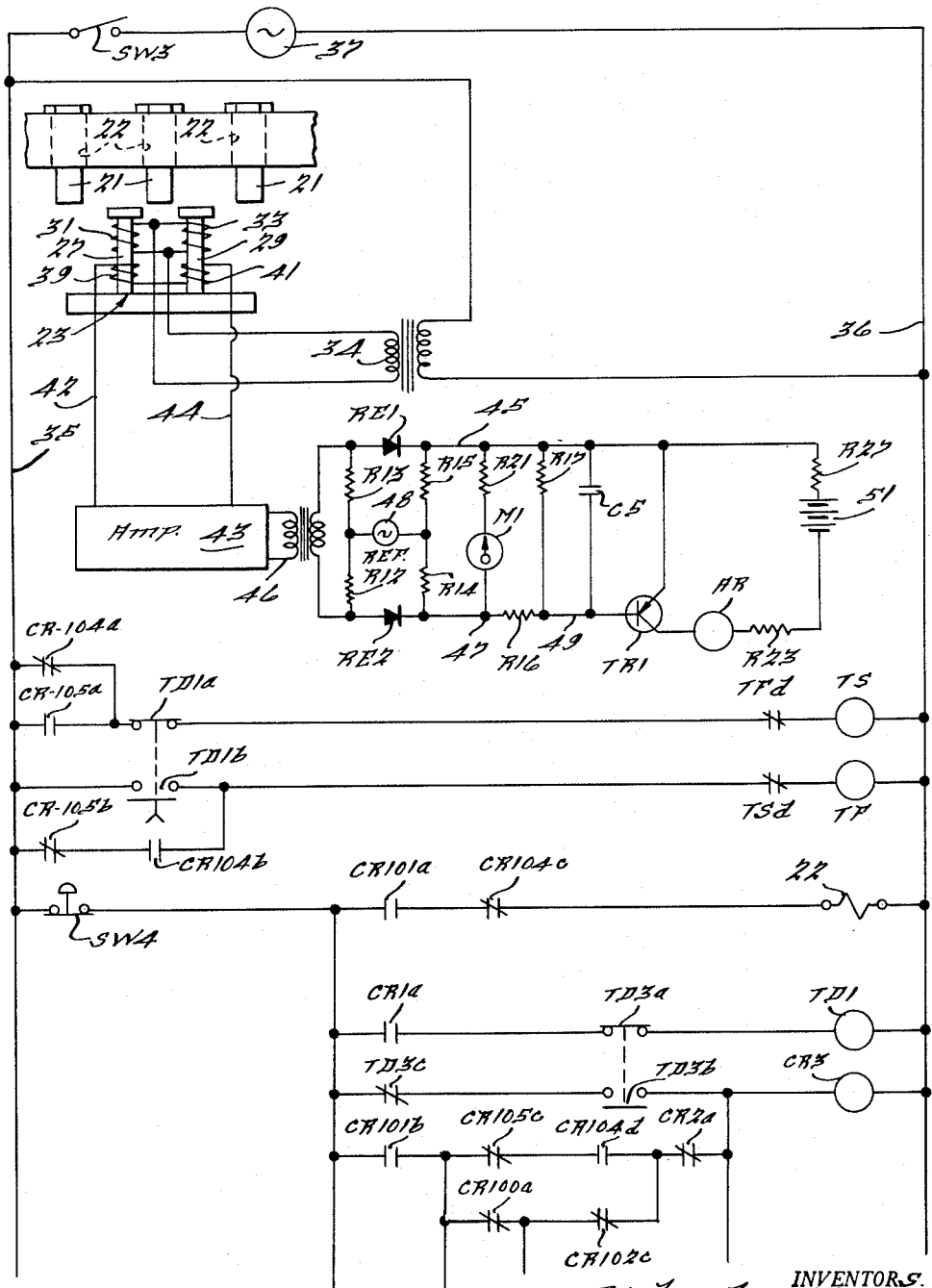

United States Patent Office 3,011,113
Patented Nov. 28, 1961

3,011,113
POINT-TO-POINT MEASURING AND POSITIONING CONTROL SYSTEM FOR MACHINE TOOLS OR THE LIKE
Richard A. Jerue, Birmingham, and Allen N. Sweeny, Grosse Pointe, Mich., assignors to De Vlieg Machine Company, Royal Oak, Mich., a corporation of Michigan
Continuation of application Ser. No. 808,823, Apr. 24, 1959. This application May 27, 1960, Ser. No. 32,311
19 Claims. (Cl. 318—467)

This invention relates to the accurate positioning of relatively movable members and particularly to a point-to-point positioning and measuring system for machine tools or the like.

This application is a continuation of applicants' co-pending application, Serial No. 808,823, filed April 24, 1959, now abandoned.

It is an object of the present invention to provide a machine control system whereby large movable supporting members may be accurately and rapidly located in any desired position along the path of their movement.

It is another object of the present invention to provide means for accurately locating the work or tool supporting member of a machine tool for the performance of successive machining operations at different locations on a workpiece.

It is another object of the present invention to provide a measuring system of high accuracy through the use of a relatively simple and inexpensive coarse measuring system by which a relatively long distance is divided into equal units and a precise fine measuring system capable of resolving each of the units into minute dimensions.

It is another object of the present invention to provide a machine tool control system in which the dimensions locating desired machining operations may be conveniently fed into the machine by the rotation of knobs or dials, the dimensions thus established displayed on a visual indicating device in an easily read form and the tool or work supporting member caused to move to the established position at a given signal.

It is a further object of the present invention to provide a control system of the above character which is sturdy in construction, low in cost and highly reliable in operation.

It is another object of the present invention to provide a positioning control system for a machine tool which may be readily adjusted for each new workpiece to correlate the dimensions fed into the system to any desired reference point on the workpiece.

It is another object of the present invention to provide a control device of the above character having an elongated bar provided with a series of spaced reference portions thereon mounted on one of two relatively movable members and an adjustable sensing head on the other of the members for detecting the position of an adjacent one of the reference portions.

It is a further object of the present invention to provide a control device of the above character by which the movable member is driven to position a selected one of the reference portions approximately opposite the sensing head and the sensing head is thereupon actuated to control the fine positioning of the movable member by detection of the selected reference portion.

It is another object of the present invention to provide a machine tool positioning control device of the above character which eliminates the need for special jigs, fixtures, measuring rods, or other separate measuring means.

It is another object of the present invention to provide a machine tool control system of the above character in which a movable supporting member may be driven to any given position from any other given position.

It is still another object of the present invention to provide a positioning control system of the above character utilizing a precision lead screw for adjustment of the sensing head in which special means are provided to permit the use of the shortest possible lead screw for the range of adjustment afforded.

It is a still further object of the present invention to provide a control device of the above character which may be rapidly adjusted and set for a given workpiece and which permits the use of an almost unlimited variety of locations as a reference or zero point from which the desired dimensions may be taken.

It is a still further object of the present invention to provide a control device of the above character which achieves a large measure of automation, substantially reduces the chance of human error and may be operated by less skilled workmen than has been previously necessary.

Other objects and advantages of the present invention will become apparent from the following detailed description taken in conjunction with the accompanying drawings wherein:

FIG. 2 illustrates another portion of the subject measuring and positioning control system;

FIG. 3 is a fragmentary view in partial section of the structure illustrated in FIG. 2;

FIG. 4 is a schematic representation of a portion of the electrical control circuitry of the subject measuring and positioning control system;

Figure 1:
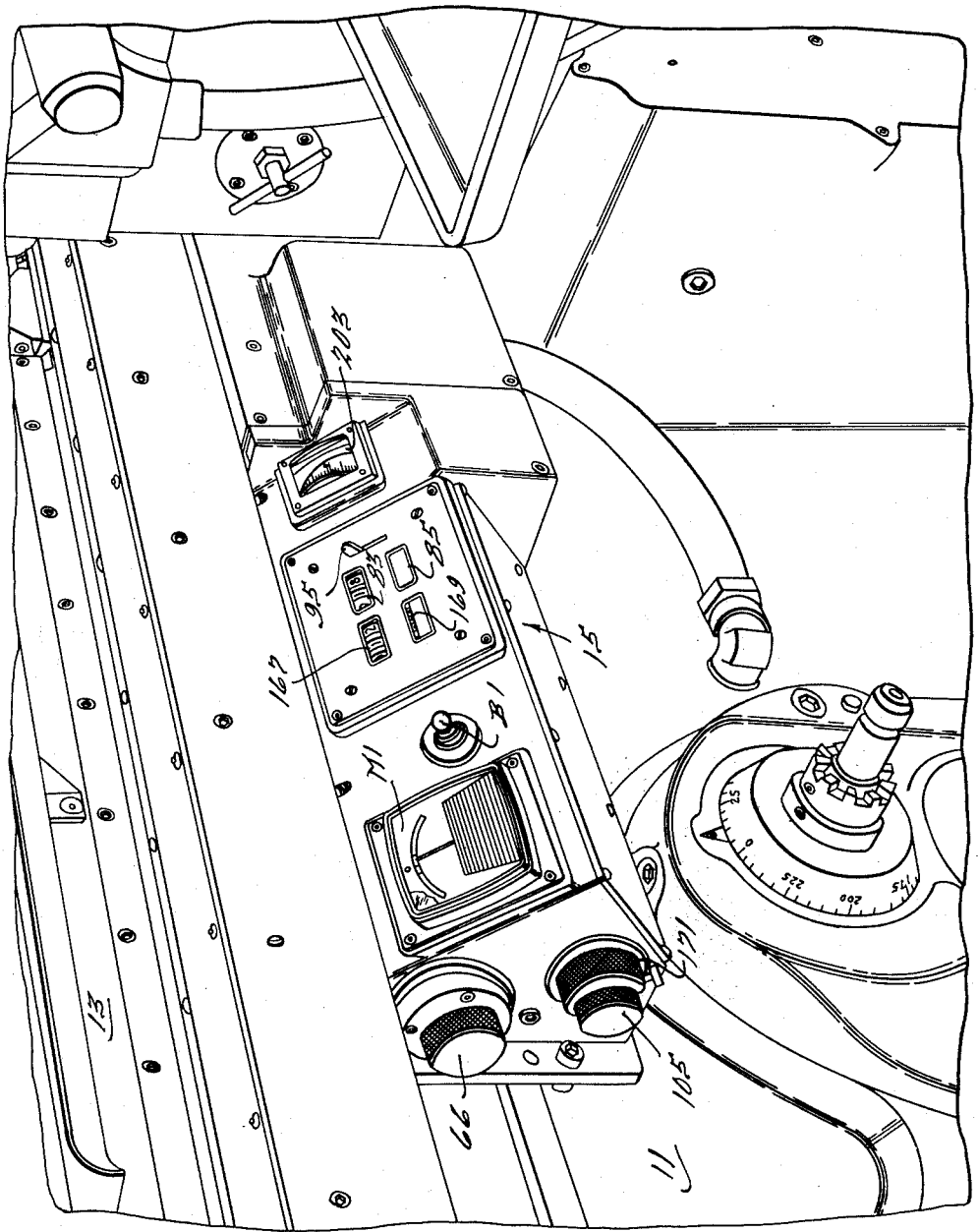
FIGURE 1 is a perspective view of a control and indicating panel constituting a portion of the subject measuring and positioning control system shown in association with a fragmentarily illustrated machine tool.

While the invention, in its broadest aspects, has reference to the positioning of any two selectively movable members, the invention is illustrated herein as applied to a machine tool having a fixed base 11 on which a table 13 is supported for horizontal rectilinear movement. The table 13 is adapted to support a work-piece and, by movement of the table, various portions of the work-piece may be presented to a cutting or other work performing tool. The machine is illustrated as being equipped with suitable driving means, such as a two-speed reversible motor 14. The motor 14 is illustrated as driving through a gear box or transmission 16 to produce rotation of a lead screw 18, which is rotatably supported in the base 11. The lead screw 18 has a threaded engagement with a nut 20 secured to the underside of the table 13 and rotation of the lead screw thus effects linear movement of the table. The gear box 16 is provided with a solenoid 22 (FIG. 4) which shifts certain gearing (not shown) to change the rate of rotation of the lead screw for a given speed of the motor. As illustrated herein, the measuring and positioning system of the present invention is embodied in mechanism and control circuitry by which the motor 14 and solenoid 22 are energized in such a manner as to accurately position the table in any selected location along the path of its movement.

The system of the present invention may be used with equal facility on a wide variety of machine tools, such as horizontal boring mills, jig borers, drill presses, punch presses, or any other machine tool capable of utilizing what has become known in the trade as a "point to point" positioning system. In addition, the control system may be used in connection with either the work support or the tool support. Thus, in a horizontal boring mill, one system could be used to position the table and another to position the spindle housing, thereby obtaining a coordinate position on two axes.

The movement of a work supporting table in a machine by rotation of a large, long driving lead screw is a common practice. Certain prior positioning systems have attempted to rely upon this power drive lead screw to measure the position of the support. Such systems have been demonstrated to suffer from substantial inaccuracies. The weight of the workpiece on the table, for example, can vary by a wide margin and the stress conditions present in the lead screw will vary accordingly. In addition, the drive lead screw is subject to far greater wear and irregularity than a small micrometer lead screw which is not required to perform any significant power transmission function and is relatively short. Accordingly, the measuring and position sensing components of the present system are wholly independent of the mechanism by means of which the support is physically driven or moved.

The invention generally involves the use of an elongated rod 19 (which for convenience of manufacture may be made in separate sections 19a, 19b and 19c, etc.) mounted on the table 13 and having a plurality of linearly spaced reference portions 21 arranged in the direction of movement of the table. A sensing head 23 is mounted within a casing 15 on the base 11 and is operable to remotely detect the position of any one of the reference portions 21 in proximity thereto. While the elongated rod 19 is illustrated herein as being mounted on the table 13, which is the movable member of the combination, the rod 19 may be mounted on either of the two relatively movable members (the table 13 or the base 11) with the sensing head 23 being mounted on the other of said members. The sensing head 23 is adjustable in a direction parallel to the elongated rod 19 by means of a micrometer lead screw 25. The extent of its adjustment is at least equal to the distance between the reference portions 21, and by the rotation of the lead screw 25 the position of the sensing head 23 may be adjusted to establish parts of the distance between the reference portions 21, as will be fully explained hereafter.

In practice, the rod sections 19a, 19b and 19c, etc. are provided with a plurality of bores 22 for the reception of metal pegs which form the reference portions 21. The pegs 21 are set apart an equal distance, which preferably corresponds to a convenient unit of measurement, such as one inch. In addition, the pegs 21 are of high magnetic permeability. The sensing head 23 is, in effect, a magnetic pick-up unit or differential transformer having spaced pole pieces 27 and 29 provided with connected primary windings 31 and 33, respectively. The windings 31 and 33 are supplied with alternating current from a stepdown transformer 34, the primary winding of which is connected across a pair of conductors 35 and 36. The conductors 35 and 36, which service the entire circuit, are connected to a source of alternating current, indicated at 37, and the entire circuit may be opened and closed by a line switch SW3 inserted in the conductor 35. The flow of alternating current through the windings 31 and 33 induces a current in each of a pair of secondary windings 39 and 41 wound on the poles 27 and 29, respectively.

The two secondary windings 39 and 41 of the pickup head 23 are connected in series opposing or bucking relationship so that when the reluctance of the two magnetic circuits including the two cores are equal, the output voltage appearing between conductors 42 and 44 will be zero. When the pickup head is not centered upon one of the pins 21, and one of the poles 27 or 29 is near to the opposite pin 21, then the reluctance of the magnetic circuit including said one pole will be decreased, while the reluctance of the magnetic circuit including the other pole will increase. As a consequence, the amplitude of the output from the secondary winding 39 or 41 about the nearer pin will be greater than the output of the other secondary winding and an alternating voltage will appear between conductors 42 and 44 having an amplitude which varies in accordance with the distance between the center of the selected pin 21 and the center of the pickup head 23 and being of one phase or the opposite phase in accordance with the direction of the positional deviation.

This alternating voltage is applied to the input terminals of an amplifier 43 which develops across the primary winding of the output transformer 46 an alternating voltage which is phase related to the input alternating voltage thereto and which has an amplitude related to the amplitude of that input voltage. The resultant alternating voltage induced in the secondary winding of transformer 46 is developed across serially interconnected resistors R13 and R12. Resistor R13 is connected in series with a unidirectional current conducting device or rectifier RE1, load resistor R15 and a source of reference voltage 48, and resistor R12 is connected in series with a rectifier RE2, load resistor R14 and the source of reference voltage 48. The source 48 produces an alternating reference voltage of fixed or substantially fixed amplitude and which is derived from source 37 so as to be in phase with the voltage developed across one of the windings 39 and 41 and out of phase with the voltage across the other.

During that half cycle of the alternating reference voltage in which the left-hand terminal of source 48 is positive relative to the right-hand terminal of that source, and assuming that at that instant the polarity of the input signal to amplifier 43 is such that the upper terminal of resistor R13 is positive relative to the lower terminal of resistor R12, the signal voltage developed across resistor R13 and the reference voltage are in series aiding relationship and produce a current through rectifier RE1 to develop a direct voltage across resistor R15 of a polarity such that the upper terminal of that resistor is positive relative to the lower terminal thereof. The amplitude of that direct voltage varies in accordance with the sum of the signal voltage across resistor R13 and the reference voltage from source 48. At the same instant, the signal voltage developed across resistor R12 is in opposing or bucking relationship to the reference voltage. In the preferred practice, the magnitude of the reference voltage is selected to be greater than the magnitude of the maximum signal voltage which will be developed across either resistor R12 or R13. Accordingly, at this instant, rectifier RE2 will conduct current to develop across load resistor R14 a direct voltage having an amplitude determined by the difference between the reference voltage and the signal voltage developed across resistor R12, and having a polarity such that the upper end of resistor R14 is negative relative to the lower end thereof. Accordingly, the direct voltages which are developed across resistors R15 and R14 are of opposite polarity and the difference between those voltages appears between conductors 45 and 47.

At the opposite half cycle of the sinusoidal reference voltage from source 48, neither rectifier RE1 nor rectifier RE2 will conduct since, as above noted, it is assumed that the magnitude of the reference voltage always exceeds the signal voltage across either resistor R12 or R13.

When the signal voltage is of the opposite phase, the direct voltages which are developed across resistors R14 and R15 will each be of the same polarity as above discussed, but the magnitude of the voltage across resistor R14 will exceed the magitude of the voltage across resistor R15 so that the resultant direct voltage appearing between conductors 45 and 47 will be of the opposite polarity, that is, the potential of conductor 47 will be positive relative to that of conductor 45.

The voltage between conductors 45 and 47 is developed across a serially interconnected resistor R21 and a meter M1 (such as a center-reading microammeter) which indicates the direction and magnitude of the voltage difference between conductors 45 and 47 and reflects the direction and distance of deviation of the pickup head from the centered position. If desired, a source of adjustable voltage can be inserted in the circuit of meter M1 to permit the needle of the meter to be centered at the center position of the pickup head, even though a small voltage difference does exist at that time between conductors 45 and 47 due to circuit unbalance.

The differential voltage appearing between conductors 45 and 47 is also filtered by means of the network including resistors R16 and R17 and capacitor C5 and developed between conductors 45 and 49. Conductor 45 is connected to the emitter of a transistor TR1 and the base of that transistor is connected via conductor 49 to the junction of resistors R16 and R17. The collector of transistor TR1 is connected through the winding of control relay AR, resistor R23, source of direct voltage 51 and resistor R27 to conductor 45 and hence to the emitter of transistor TR1. When the filtered direct voltage appearing between conductors 45 and 49 is of a polarity such that conductor 45 is positive relative to conductor 49 and is of at least a preselected amplitude, transistor TR1 will sharply conduct and sufficient collector current will flow to energize relay AR to cause that relay to close its contacts AR*a*. When the filtered direct voltage appearing between conductors 45 and 49 is of the opposite polarity, transistor TR1 will not conduct and relay AR will not be energized. Accordingly, transistor TR1 serves as a unidirectionally operating triggering device so that relay AR will be actuated only if an error signal of a preselected amplitude appears at the input terminals of amplifier 43 and only if that input signal is of a certain preselected phase with relation to the phase of the reference voltage 48. Thus, if the center of the head 23 is positioned on one side of a selected pin 21, the relay AR will be energized and its contacts AR*a* closed, while if the exact center of the head is located on the other side of the adjacent pin, the contacts AR*a* will be open. In the embodiment illustrated herein, the contacts AR*a* are open when an adjacent insert 21 is to the left of the sensing head 23, and closed when the adjacent insert is to the right of the sensing head.

From the foregoing, it will be seen that as the table 13 is driven and the inserts 21 successively move past the sensing head 23, the relay AR will be alternately energized and deenergized to open and close its contacts. As will be subsequently explained in describing FIGS. 5, 6 and 7, the opening and closing of the contacts AR3 can be made effective to control the movement of the table 13 through a predetermined cycle so that the table will come to rest with the head 23 centered on one of the inserts. However, the contacts AR*a* are disabled from performing this function during a preliminary movement of the table and are not re-enabled until the sensing head is approximately opposite a selected one of the pins 21. Thus, for a machine tool operator to "dial in" or establish a desired dimension, one setting is made on a coarse position mechanism, which determines the insert 21 with respect to which the head 23 will center and thereby establish the number of full inches in the desired dimensional position of the table. Next, a second setting is made to adjust the position of the sensing head 23 on the lead screw 25 and thus establish the desired dimensional position of the table within the inch.

*Fine position mechanism*

The sensing head 23 is mounted in a precision machined block 57 carried on a tube 59 supported within the casing 15 by bushings 61 and 63 for sliding movement in a direction parallel to the inserts 21. The interior of the tube 59 has an internally threaded nut portion 65 which may be machined directly into the tube 59 or may be made in the form of a separate nut secured in the tube 59. The nut portion 65 threadably engages the micrometer lead screw, which is supported for rotary movement but is held against axial movement. The tube 59, while free to slide axially, is held against rotation. Thus, rotation of the micrometer lead screw 25 produces linear movement of the sensing head 23 in a direction parallel to the inserts 21.

Rotation of the precision lead screw 25 is accomplished by rotation of a knob 66 fixed to one end of a shaft 67. The opposite end of the shaft 67 carries a clutch plate 69 adapted to engage a mating clutch plate 71 carried on one end of a shaft portion 73. The shaft portion 73 is integrally connected to the lead screw 25 by an intermediate shaft portion 75. By pushing in on the knob 66 the clutch plates 69 and 71 may be directly engaged for rapid adjustment of the lead screw 25. Fine adjustment of the lead screw 25 may be accomplished by pulling out on the knob 66 to engage a spur gear 78 carried on the shaft 67 with a gear 79 and thus drive the shaft 73 through a pair of reduction gears 81. To indicate the adjusted position of the pickup head 23, the rotational movement for rotating the micrometer lead screw 25 also produces rotation of a geared pair of counters or cyclometers 83 and 85 through a pair of spur gears 87 and 89. Each of the counters 83 and 85 has two dials carrying digits from zero to nine and each is thus adapted to indicate any number from zero to "99." The counters 83 and 85 are geared together in such a manner as to be simultaneously actuated in opposite directions by the rotation of the gear 89. However, the counter 83 is provided with a shutter 91 and the counter 85 is provided with a shutter 93, both of which shutters are controlled by a lever 95 in such a manner that one or the other of the shutters 91 or 93 always covers its associated counter. Thus, if the lever 95 is pushed downwardly the shutter 93 will retract to expose the counter 85 and the shutter 91 will cover the counter 83. The counter 83 has its digits painted in black and is used in establishing positive dimensions, while the counter 85 has its digits painted in red and is used in establishing negative dimensions. It will be seen that both of the counters 83 and 85 have what appears to be a third window, but which is, in effect, a decimal point indication 97. The digits of the counters 83 and 85 indicate dimensions in the order of one-tenth and one one-hundredth of an inch. The third and fourth digits after the decimal point are indicated by a finely graduated dial 99 rotatably supported on a shaft 101 and driven in rotation by means of a pair of precision spur gears 103 rotatably interconnecting the lead screw 25 and the shaft 101. The surface of the dial 99 is divided into one-hundred parts and opposite numbered digits are provided on opposite sides thereof for reading either positive or negative dimensions. The sum of the dimensions indicated on the counters 83 and 85 and on the left and right-hand sides of the dial 99 always equal either one inch or zero. Thus, the visual indicating media of the fine position mechanism serves to indicate the adjusted position of the head 23 with respect to the opposite ends of a one-inch distance. When setting negative dimensions, the zero position is taken to be a one end of this distance and when setting position dimensions, the zero adjusted position of the head is considered to be at the opposite end of this distance.

While the lead screw 25 may be made in varying pitches and the relative dimensions and proportions of the parts are largely a matter of choice, one successful working embodiment of the present invention was made in which the micrometer lead screw had twenty threads to the inch. Thus, the dial 99 made one complete revolution for each fifth of a revolution of the micrometer lead screw 25 and, for each revolution of the dial 99 a new digit appeared on the second dial of the fine positioning counters 83 and 85.

*Coarse position mechanism*

The coarse positioning of the system is set by rotation of a knob 105 which is fastened to one end of a shaft 107. The opposite end of the shaft 107 carries a spur gear 109 which meshes with a spur gear 111 freely rotatable on a shaft 113. The spur gear 111 is integrally joined to a bevel gear 114a which forms one side of a differential gear unit 115. The differential has a spider or block 116 fixed to the shaft 113 and the spider carries a pair of planetary bevel gears 117a and 117b meshing with the bevel gear 114a and a bevel gear 114b on the opposite side of the unit. The bevel gear 114b is integrally joined to a spur gear 119 and both are free to rotate on the shaft 113. The spur gear 119 drivingly engages a spur gear 121 fixed on one end of a shaft 123. A portion of the shaft 123 is of non-cylindrical cross section and has a sleeve 125 of conforming interior cross section slidably but corotatably mounted thereon. The sleeve 125 is integrally connected to a bevel gear 127 which engages a bevel gear 129 mounted in the block 57. The bevel gear 129 is rotatably connected to a pinion 131 which engages a pinion 133 which, in turn, engages a pinion 135, all of said pinions being rotatably supported in the block 57. The pinion 135 is positioned at the forward end of the block 57 and engages a rack 137 mounted on the table 13 parallel to the elongated rod 19. Thus, movement of the table relative to the block 57 causes rotation of the pinion 135, which rotation is transmitted to differential unit 115 through the before-mentioned gearing and is reflected in rotation of the shaft 113. The angular position of the shaft 113 is reflected by a cam member 139 fixed to the left-hand end of the shaft 113 as viewed in FIG. 2 and as shown in greater detail in FIG. 3. The cam 139 is in the form of a disk having approximately one half of its periphery disposed on a cylinder of a lesser diameter than the other portion of its periphery. That portion of the periphery of the cam which is of lesser diameter is referred to as the low side 141, while that portion of a greater diameter is termed the high side 143. Joining the low side 141 and the high side 143 are a pair of sloping shoulders 145 and 147 disposed approximately 180° apart and forming trip points on the cam's periphery. The cam 139 is mounted in proximity to a supporting plate 149 having mounted thereon a pair of pivot arms 151 and 153 carrying cam followers in the rollers 155 and 157, respectively. The opposite ends of the arms 151 and 153 are provided with adjustable set screws 159 and 161 surrounded by a pair of springs 163 and 165 operable to keep the rollers 155 and 157 in engagement with the cam periphery. When the rollers contact the cam tripping points or shoulders 145 and 147, the set screws 159 and 161 are either depressed or raised to actuate switches LS1 and LS2, respectively.

The switches LS1 and LS2 are not used simultaneously in the operation of the machine, but are used alternatively, depending upon the position of the shutter lever 95. For this purpose, a switch SW1 is provided for actuation by the lever 95 and it selects which of the switches LS1 or LS2 will be utilized. The selected ones of the switches LS1 or LS2 is designed to be tripped by the cam 139 when the pickup head 23 is in proximity to a selected one of the magnetic inserts 21, and the actuation of that switch renders the contacts ARa, which are controlled by the pickup head 23, effective to control positioning of the table so that the table will come to rest with the sensing head 23 centered on the selected one of the inserts 21. This is accomplished by initially adjusting the cam to displace the operative tripping shoulder 145 or 147 from its associated roller. When the table 13 is then moved, the shoulder will then be rotated back toward its roller to trip the switch LS1 or LS2 at the appropriate moment. This "feed back" rotation of the cam is produced by the rotation of the pinion 135 in the rack 137, which rotation is transmitted through the previously described gearing to the bevel gear 114b of the differential gear unit 115. The adjustment of the cam for a desired dimensional movement of the table 13 is made by rotation of the knob 105, which also actuates a pair of geared counters 167 and 169 which represent the numbers to the left of the decimal point in the desired dimension. The gearing of the mechanism is so related that when the table has moved to the approximate position indicated by the full inch counters 167 and 169, the cam 139 will have been rotated back to its tripping position to actuate the switch LS1 or LS2.

The counters 167 and 169 are driven by means of a sleeve 171 surrounding the shaft 107 and a portion of the knob 105 and is rotatable therewith by tightening of a set screw 173. The sleeve 171 carries a spur gear 175 which drives a gear 177 through an intermediate reducing gear 179, the gear 177 being connected to the drive shaft of the counters 167 and 169. The counters 167 and 169 each have three dials provided with digits from zero to nine and are adapted to count from zero to 999. Suitable gearing (not shown) is provided between the counters 167 and 169 so that they are simultaneously driven in opposite directions and have a common zero reading for a given position of the knob 105. However, the counter 167 is provided with a shutter 181, and the counter 169 is provided with a shutter 183, one of which shutters is always closed, and the shutters being so arranged that when one counter is reversely rotated to pass from a positive number through zero to a series of numbers beginning with 999, its shutter is automatically closed and the shutter of the other counter is opened. The counter 167 has its numbers painted in black to indicate a positive dimension from the reference point and the counter 169 has its digits painted in red to indicate a negative dimension from the reference point. Counter 167 is adapted to be read with respect to the numbers of the counter 91 which is horizontally opposite thereto. Counter 169 is adapted to be read with the counter 85 horizontally opposite thereto. To hold the coarse adjustment mechanism in the desired positions, a spring-loaded detent 189 is provided to engage depressions in the sleeve 171.

*"Set up" of the system*

When a new workpiece is clamped on the table 13 of the machine, the system of the present invention must be "set up" or coordinated to the workpiece. In most cases, the drawings of the workpiece from which the machine operator is working will have the bulk of the horizontal dimensions taken from a given edge, center line of a bore, or vertical surface and such edge, center line or surface may be conveniently utilized as a zero or reference point for the dimensions fed into the system. Thus, to bore a hole, for example, which is 12.1800 inches from the reference plane, this dimension may be dialed directly into the mechanism. To permit such direct dialing in of the dimensions appearing on the drawings, the work table 13 is moved so as to position the desired reference plane on the workpiece in alignment with the axis of the machine spindle (not shown). Such positioning is a standard machine tool operating procedure and methods for accomplishing the same are well known in the art. With the table 13 thus positioned, the knob 66 is rotated until the fine position counters 83 and 85 read "00" and the fine position dial 99 reads "00." The knob 105 is then rotated to cause the full-inch counters 161 and 169 to read "000." Thus, all of the visual indicating media reflect the relationship of the position of the machine spindle to the vertical reference plane on the workpiece. Next, the position of the block 57 on the tube 59 is adjusted to center the sensing head 23 on the nearest of the magnetic pegs 21. This adjustment is accomplished by rotation of a threaded stud 193 which is rotatably fitted at its inner end in the block 57 by ball bearing 195, is supported at its outer end by bearing 196, and is threaded through the threaded aperture 197 in a bracket 199. The bracket 199 is clamped onto the tube 59 and rotation of the stud 193 through its aperture 197 effects sliding movement of the block 57 up and down the tube 59. In addition, the bracket 199 prevents rotation of the tube 59. The sleeve 125 and its bevel gear 127 are free to slide up and down the shaft 123 and maintain driving engagement with the bevel gear 129. When the head 23 is centered on the nearest peg 21, this position will be indicated by the electrical indicating instrument M1, which may be observed by the machine operator. The block may be provided with any suitable means (not shown) for releasably clamping it on the tube once it is in proper position. In addition, further rigidity for the block 57 and bracket 199 is provided by a rod 201 which passes through said members and on which said block and bracket are slidable.

The final adjustment in setting up the mechanism is made by loosening the set screw 173 to permit rotation of the knob 105 without rotating the counters 167 and 169. The knob 105 establishes the cam in a position in which it trips the switch LS1 or LS2. This position is determined by reference to a "zeroing light" or bulb B1. Assuming the switch SW1 is in a position in which its contacts SW1a are closed, a circuit will be completed through the contacts LS2b when the cam is on one side of its tripping position and the bulb B1 will thus be illuminated. When the cam is rotated to its tripping position, the contacts LS2b will open to turn off the bulb B1, thereby indicating to the machine operator that the cam is in a tripping position for the switch LS2. When in this position, the set screw 173 is re-tightened and the entire system is ready for operation.

It should be pointed out that while the table 13 may have a maximum travel of 99 inches or less, the use of coarse counters 167 and 169 having three wheels rather than two wheels is still advantageous. The reason for this is that dimensions on a blueprint of a large part or on a workpiece constituting a sub-part may be taken from a location far off of the table. Assuming that a workpiece reference plane which is on the table is a known distance from the zero or reference point on the drawing, this known dimension may be established on the counters when the system is set up and this reference plane aligned with the machine spindle. Thus, in dialing dimensions into the mechanism in the course of matching a part, it will not be necessary to subtract the distance between the workpiece reference plane on the table and the reference point of the drawings from the dimensions given on the drawings, and the machine operator may work directly from the dimensions appearing on the drawings, no matter how great the dimensions on the drawings may be (but not exceeding the capacity of the coarse counters, which in the present embodiment is +999 inches).

*Operation*

For purposes of illustration, it may be assumed that all dimensions to the right-hand side of the selected reference point on the work are positive dimensions and that dimensions to the left-hand side of the reference point are negative dimensions. Thus, if the table is moved to the left, locations to the right of the reference point will be presented to the machine spindle and such movement may be described as movement in a positive direction, as indicated in FIG. 2. In dialing in the dimensions, either the fine or the coarse adjustment may be made first. Assuming that it is desired to move 12.1800 inches in a positive direction from the reference point, the knob 105 is rotated until the number 012 appears in the upper coarse counter 167. The lower counter 169 will be covered by its shutter 183 and will not be visible. By rotating the knob 105, the spur gear 111 will be rotated to angularly displace the bevel gear 114a on the left-hand side of the differential 115, the bevel gear 114b on the right-hand side of the differential being held against movement by the gear 119 and its related gearing. The spider 117 of the differential is thus angularly displaced, as is the shaft 113 and cam 139. The angular displacement of the cam 139 will be such as to offset the shoulder 147 from the roller 157 a predetermined amount, which amount will equal the amount the cam 139 will be rotated in the reverse direction by the rotation of the pinion 135 in moving along twelve inches of the rack 137.

In making the fine adjustment, the lever 95 is first pulled upwardly to cause the lower fine counter 85 to be covered by its shutter 93 and expose the upper fine counter 83. The knob 66 is rotated until the one-tenth and one-hundredth of an inch portions of the desired dimension appear on the counter 83. This adjustment may be made rapidly by pushing the knob 66 inwardly to engage the clutch plates 69 and 71. The one-thousandth and ten-thousandth of an inch portions of the desired dimensions are made on the dial 99 which is read against a hair line on a lens 203 covering the dial (FIG. 1). To facilitate making this adjustment, the knob 66 may be pulled outwardly to engage the spur gear 78 with the spur gear 79 and drive through the reduction gearing 81. In making the fine setting, the tube 59, the block 57 and the sensing head 23 will all have been moved in a left-hand direction the amount indicated on the counter 83 and dial 99. By the highly precise finishing of the lead screw 25 and the rigid mounting of the block 57 on the tube 59, this adjustment may be made with a high degree of accuracy.

Figure 5:
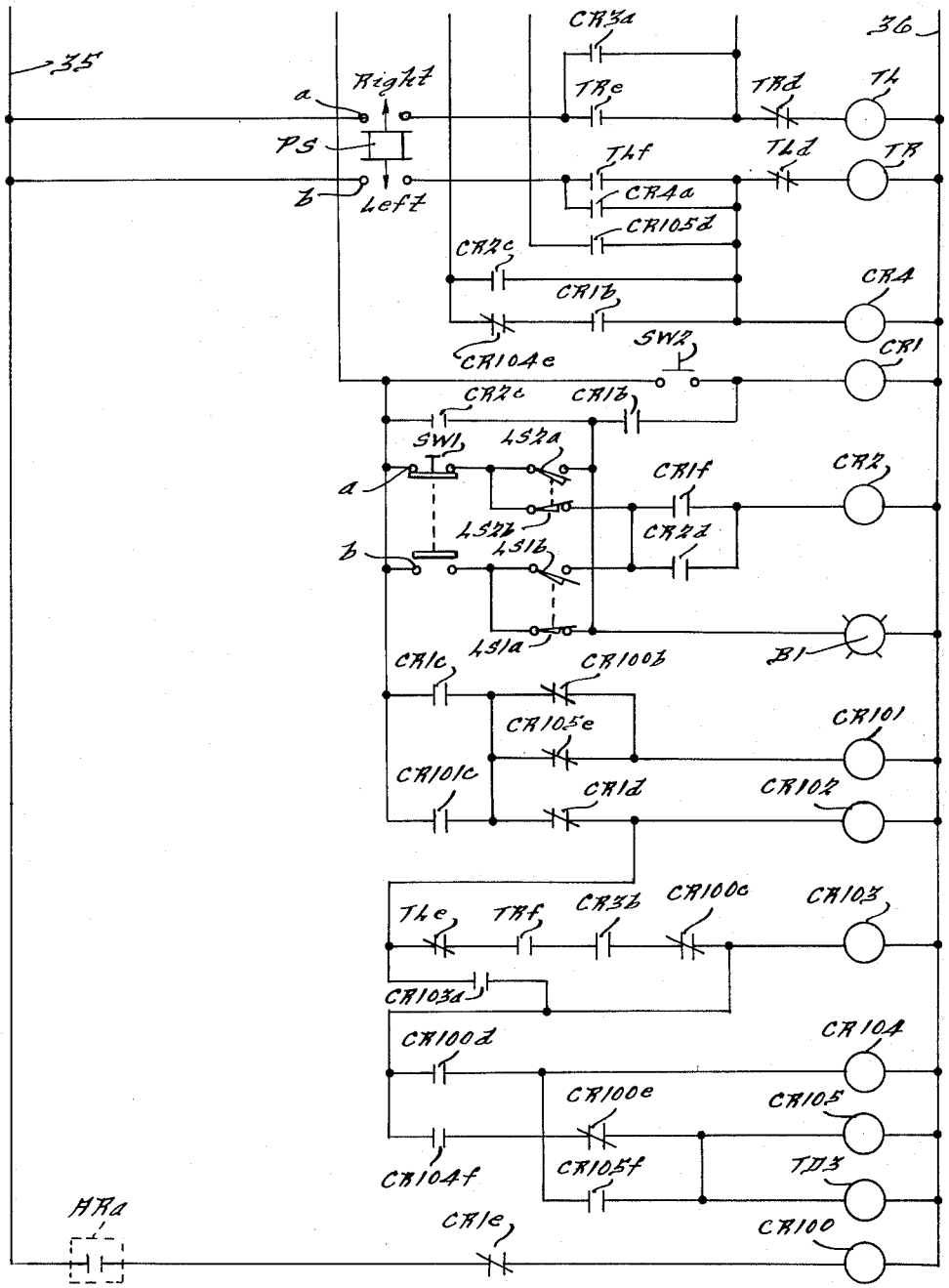
FIG. 5 is a schematic representation of another portion of the circuitry of FIG. 4 and should be placed below FIG. 4 for proper orientation.
Figure 6:
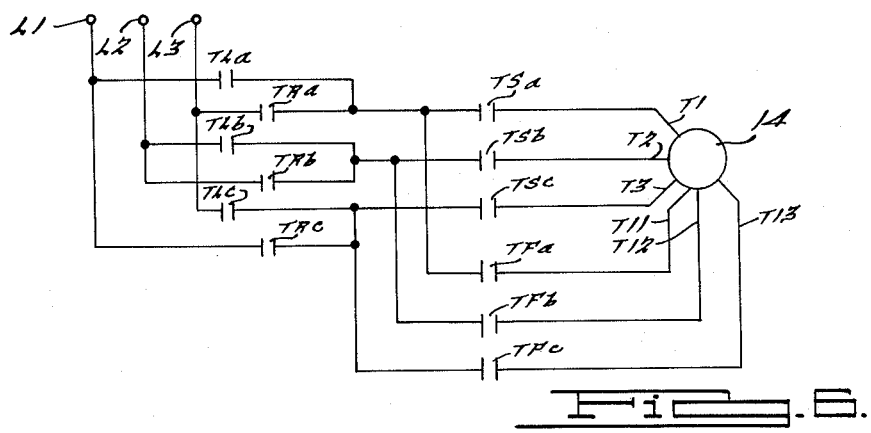
FIG. 6 is a schematic representation of another portion of the control circuitry of the subject measuring and positioning control system.

In the course of making the fine adjustment, the linear movement of the block 57 will have caused rotation of the pinion 135 by its movement along the rack 137. Such movement will effect rotation of the gear 119 and thus rotation of the spider 116 of the differential 115. Such movement will be in a direction to adjust the angular displacement of the cam an amount corresponding to the fractional adjustment made. This adjustment in the setting of the cam 139 assures that the limit switch LS2 will trip when the sensing head 23 is opposite the desired one of the pegs 21, rather than when it is closer to an adjacent of said pegs. Without this added adjustment of the cam 139, when the sensing head is set at a position above .5000 inch it would be closer to the next adjacent insert 21 than to the intended insert when the switch LS1 or LS2 tripped, which would result in centering of the sensing head 23 on the wrong insert. Once the desired dimensions have been dialed into the mechanism, the system is ready for the automatic positioning operation. Generally, the operation of the subject system involves the movement of the table to a position in which the sensing head 23 is approximately centered relative to a selected peg 21. Thereupon, a selected one of the switches LS1 or LS2 is actuated by the cam 139 to initiate a predetermined cycle in which the opening and closing of the contacts ARa is utilized to sense when the table 13 is in the selected position and the direction of the deviation from the selected position. While the opening and closing of the contacts ARa may be utilized in various ways to position the table 13, FIGS. 4, 5 and 6 illustrate one method of accomplishing this objective in a highly precise manner. The table is controlled in such a manner that it moves through a predetermined cycle which culminates in the table coming to rest in the desired dimensional position. In the course of its cyclical movement, the table is moved back and forth across the desired position at successively reduced speeds so that the overrun of the table past the desired location is successively reduced to a negligible amount.

Figure 7:
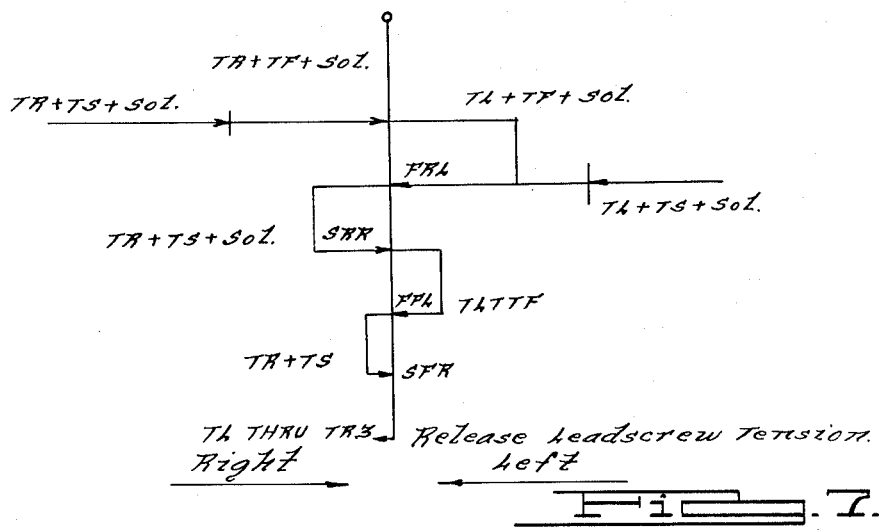
FIG. 7 is a graphic representation of the movement of the machine tool work table as controlled by the circuitry illustrated in FIGS. 4, 5 and 6.
Figure 8:
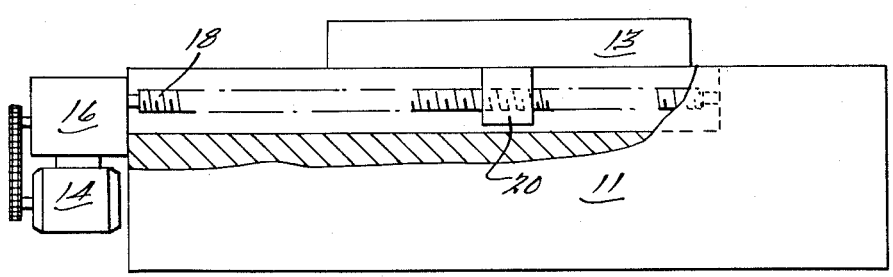
FIG. 8 is a diagrammatic view of the machine tool with which the subject measuring and positioning control system is illustrated as being used and which was fragmentarily illustrated in FIG. 1.

FIGURE 7 graphically illustrates the movement of the table 13, as governed by the control circuitry illustrated herein relative to the preselected position (indicated by the vertical line in FIG. 8). The speed and direction of movement of the table are directly controlled by certain relays and the solenoid 22 and FIG. 7 indicates which of said relays (and the solenoid) are energized during any particular portion of the positioning cycle. Relays TF (Table Fast) and TS (Table Slow) are operable to regulate the speed of the motor 14. When relay TF is energized and relay TS is deenergized, the contacts TFa, TFb and TFc close and the contacts TSa, TSb and TSc open (FIG. 6) in order to connect the high speed windings of the motor M14 to leads L1, L2 and L3 which are connected to a source of three-phase current. Similarly, when the relay TS is energized and the relay TF is deenergized, the low speed windings of the motor 14 are connected to the leads L1, L2 and L3. The direction of rotation of the motor 14 is controlled by relays TL (Table Left) and TR (Table Right). When relay TL is energized and relay TR is deenergized, contacts TLa, TLb and TLc will close and contacts TRa, TRb and TRc will open (FIG. 6), and the motor 14 will be connected to leads L1, L2 and L3 in such a manner as to be rotated in a direction driving the table 13 in a left or positive direction. Similarly, when the relay TR is energized and the relay TL deenergized, the contacts TRa, TRb and TRc will close and the contacts TLa, TLb and TLc will open to energize the motor 14 in the opposite direction such that the table will be moved in a right-hand or negative direction. The rate of movement of the table 13 is additionally controlled by the solenoid 22. When the solenoid is energized, high speed gearing (not shown) within the gear box 16 is engaged to drive the table at a relatively "rapid" rate. When the solenoid 22 is deenergized, certain reduction gearing is engaged to drive the table 13 at a slow speed, nominally termed a "feed" rate.

Upon closure of the line switch SW3 and prior to initiation of the automatic position cycle by operation of switch SW2, it should be noted that the establishment of a potential between conductors 35 and 36 will have energized the winding of relay TS (Table Slow) by the establishment of a circuit through normally closed contacts TFd, TD1a and CR–104a (all the hereafter mentioned relays and the solenoid 22 are energized by the establishment of a circuit between the conductors 35 and 36, and such fact is hereafter assumed). The energization of relay TS effects closure of its contacts TSa, TSb and TSc, which prepares the low speed winding of the motor 14 for energization. In making the previously described setting of plus 12.1800 inches, the contacts SW1a of the switch SW1 will be closed, the limit switch LS2 will thereby have been selected for use in controlling the movement of the table. The establishment of a positive dimension will have rotated the cam 139 in such a direction that the contacts LS2a of the switch LS2 will be closed and its contacts LS2b will be open.

The automatic positioning cycle is initiated by the machine operator pressing the automatic positioning switch SW2 to momentarily close its contacts and thereby energize the winding of relay CR1, which causes its normally closed contacts CR1e to open and thereby prevents energization of relay CR100 until a subsequent time in the positioning cycle. Normally open contacts CR1c are closed by the energization of relay CR1 to energize relay CR101 through contacts CR1c and normally closed contacts CR100b. Contacts CR1b close to establish a holding or locking circuit for relay CR1 through contacts CR1b, contacts LS2a and contacts SW1a. In addition, relay CR101 establishes a holding or locking circuit for itself (or seals itself in) through contacts CR105e and CR101c. The solenoid 22 is also energized by the closure of contacts CR101a. Relay TL is now energized by a circuit through contacts TRd, CR2a, CR102c, CR100a and CR101b and the table begins to move in a left-hand or positive direction. Simultaneously, relay TD1a will have been energized by the closure of contacts CR1a and its contacts TD1a and TD1b will delay in opening and closing, respectively. The delay is desirably a very short one, corresponding to only one-quarter or one-half inch of table movement. The opening of contacts TD1a denergizes the relay TS and the closure of contacts TD1b energizes the relay TF, thereby changing the motor speed from slow to fast. The table is initially moved at the slow speed, in order to prevent jerking and possible dislodgement of the workpiece clamped on the table. However, after the table is initially moved from its stationary position, it may immediately be driven at a higher speed in order to approach the desired position with the least possible delay. FIGURE 7 indicates on the second horizontal line thereof the initial movement of the table in the left-hand direction. As will be seen in this figure, the relays TL, TS and the solenoid are initially energized and, after the delay, the relays TL, TF and the solenoid are energized, so that the table approaches the desired position in what may be termed "fast rapid left" (FRL).

As the table moves in the left-hand direction the pinion 135 will be rotated by its engagement with the rack 137 and effect rotation of the spider 116 of the differential 115. This rotation, which is imparted to the cam 139, is in a direction which will move the shoulder 147 of the cam back toward the roller 157 and the shoulder 147 will engage the roller 157 to actuate the limit switch LS2 when the table has moved approximately to the desired position. When the switch LS2 is actuated, its contacts LS2a open to interrupt the circuit by which the relay CR1 is energized and the relay CR1 is thereby permanently dropped out of the circuit. The deenergization of relay CR1 permits the contacts CR1e to resume their normally closed position, which thereby places the contacts ARa in a controlling position with respect to the energization of relay CR100. However, due to the speed and momentum of the table 13, the selected one of the magnetic inserts 21 will have overrun or traveled past the center position of the sensing head 23 and will be positioned to the left thereof. Therefore, the contacts ARa remain open and the relay CR100 is not as yet energized. However, the closure of normally closed contacts CR1d (due to the deenergization of relay CR1) will have established a circuit including contacts CR101c to energize relay CR102. The energizing of relay CR102 causes its contacts CR102c to open, thereby interrupting the circuit by which relay TL had been energized and effecting the deenergization of relay TL. Relay TR is simultaneously energized by the closure of contacts CR102b, which establishes an energizing circuit for relay TR through contacts TLd, CR102b, CR104e and CR101b. Additionally, relay TD1a is deenergized by the opening of contacts CR1a and its contacts TD1b are immediately opened and its contacts TD1a are immediately closed in order to deenergize relay TF and energize relay TS. Thus, the movement of the table 13 is reversed and it now moves in a right-hand direction. When the motor is rotating at a predetermined speed in the right-hand direction in making this particular movement, a plugging switch PS, which is driven by suitable gearing (not shown) in the gear box 16, is actuated in a direction closing its contacts PSa. The plugging switch PS is of the conventional type and is available on the open market (for example, General Electric plugging switch class CR2962). The closure of contacts PSa establishes a circuit through contacts TRe to energize the winding of relay CR3 which thereupon closes its contacts CR3b. As a result of the closure of contacts CR3b, the winding of relay CR103 is energized by a circuit through contacts CR100c, CR3b, TRf, TLe, CR1d and CR101c. The fact that the plugging switch PS does not close its contacts PSa until the table has started to move back in the right-hand direction assures that the relay CR103 will not be energized while the table is still traveling in a left-hand direction in its overrun after the switch LS2 has been actuated by the cam 139. The table 13 now approaches the selected position in what may be termed "slow rapid right" (SRR), that is, with relays TR and TS and the solenoid energized. This movement is represented by the third horizontal line in FIG. 7.

When, in moving back to the right, the table reaches the preselected position, the contacts ARa will be closed in response to the changed output of the sensing head 23, and the relay CR100 will in turn be energized. Thereupon, relay CR104 will be energized by the completion of a circuit through now closed contacts CR100d, CR103a, CR1d and CR101c. The energization of relay CR104 will cause normally closed contacts CR104e to open and thereby deenergize relay TR. Simultaneously, contacts CR104d will close to energize the starter TL through a circuit including contacts TDd, CR2a, CR104d, CR105c and CR101b. In addition, contacts CR104a open and contacts CR104b close to deenergize relay TS and energize relay TF. Also, contacts CR104c open to deenergize the solenoid 22. Thus, the table is moved back in a left-hand direction with the motor 14 being driven at high speed, but the motor driving through low speed gearing in the gear box 16 because of the deenergization of the solenoid. This movement is represented by the fourth horizontal line in FIG. 7 and may be termed "fast feed left" (FFL).

When the adjacent one of the inserts 21 next attains a centered position with respect to the sensing head, the contacts ARa will open and relay CR100 will be deenergized to close its contacts CR100e and thereby energize relay CR105 through a circuit including contacts CR100e, CR104f, CR103a, CR1d and CR101c. The energization of relay CR 105 causes closure of its contacts CR105f which energizes relay TD3 through a circuit including contacts CR105f, CR104f, CR103a, CR1d and CR101c. The energization of relay TD3 causes its contacts TD3a to immediately open and thereby deenergize relay TD1 and its contacts TD1a and TD1b immediately close and open, respectively, to deenergize relay TF and energize relay TS. In addition, relay TL is deenergized by the opening of contacts CR105c and relay TR is energized by the closing of contacts CR105d completing a circuit to relay TR through contacts TLd, CR105d, CR100a and CR101b. Thus, the table is moved back to the right toward the preselected position in what may be termed "slow feed right" (SFR), that is, with the solenoid 22 deenergized and relays TR and TS energized. This movement is indicated by the fifth horizontal line in FIG. 7. It should be noted that the energization CR105 effects opening of its contacts 105e, but an alternative energizing circuit for the relay CR101 is provided by the now closed contacts CR100b which are in parallel with the contacts CR105e.

When the table 13 finally reaches the selected position, the contacts ARa will again close to energize CR100 and its contacts CR100a will open to deenergize the relay TR. In addition, contacts CR100b will be opened to deenergize the relay CR101. Contacts CR101c are thereby opened to deenergize relays CR102, CR103, CR104, CR105 and TD3. The contacts TD3a and TD3c of relay TD3 immediately close but its contacts TD3b remain closed for a short interval to energize TL through a circuit including contacts TRd, TD3b and TD3c. The contacts TD3b remain closed for only a sufficient interval to relax the driving connection between the motor 14 and the table 13, that is, to split the backlash between the lead screw 18 and nut 20. The table 13 is thereby relieved of all forces acting thereon and is left floating freely upon the base 11. The automatic positioning operation is thus completed and the circuitry is in readiness for the initiation of another cycle.

The above discussed operation is applicable to any situation in which the table is to be moved from either the zero reference position or a negative position to any positive dimensional position or from one positive dimension to another greater positive dimensional position. Assume, now, that the table rests in a position of 12.1800 inches and that it is desired to move the table to a position of, for example, 6.3789 inches. This exact dimension is set on the counters 167 and 83 and on the dial 99. It should be noted that upon the completion of the first positioning cycle, the cam 139 was left in a tripping position, that is, with the roller 157 on the shoulder 147. In dialing in the new position, the cam is thus rotated in an opposite direction from that in which it was rotated in establishing the previous dimension and by an amount corresponding to the difference between 12.1800 and 6.3789 inches. By this opposite displacement of the cam, the roller 157 will now be positioned on the high side 143 of the cam (assuming that it was preset on the low side 141 in the previous operation). By this means, the switch LS2 is held in a position with its contacts LS2b closed and its contacts LS2a open (as is shown in FIG. 5). Thus, when the automatic positioning switch SW2 is momentarily actuated by the machine operator, not only will the relay CR1a be energized as in the previous embodiment, but the relay CR2 will be energized through a circuit including contacts CR1f, LS2b and SW1a. Contacts CR2d thereupon close to close to provide for continued energization of CR2, even after deenergization of the relay CR1. In addition, the energization of CR2 causes its normally closed contacts CR2a to open and thereby prevents energization of the relay TL. Simultaneously, the contacts CR2c are closed to energize relay TR through a circuit including contacts TLe, CR2b and CR101b. Contacts CR1a close to energize TD1 to drive the motor 14 in the right-hand direction first through its low speed windings and, after a slight delay, through its high speed windings, as in the previous operation. The table 13 thereupon approaches the desired position by movement in a right-hand direction as is indicated by the first horizontal line in FIG. 7. Upon reaching the pre-selected position, the shoulder 147 will have been rotated back to the roller 157 and the switch LS2 will be actuated to open its contacts LS2b and immediately close its contacts LS2a. The opening of contacts LS2b deenergizes relay CR2 and the immediate closure of contacts LS2a provides a circuit through contacts SW1a, LS2a and CR1b for the continued energization of relay CR1. The deenergization of relay CR2 causes its contacts CR2a to close and its contacts CR2b to open, thereby energizing the relay TL and deenergizing the relay TR, respectively. The table 13 thus reverses its direction of movement and approaches the preselected position by movement in a left-hand direction in "fast rapid left" and the positioning cycle continues as in the previously described operation.

It may be noted that while the plugging switch PS is illustrated herein as being operable in only one direction during the automatic positioning cycle, its contacts PSb pertain to the establishment of conditions for non-automatic control of the table (as in the initial set up of the system) and said contacts form no part of the present invention. In addition, an emergency "stop all" switch SW4 is provided by means of which the positioning cycle may be terminated at any desired instant by manual operation of said switch.

From the foregoing description of the operation of the system, it will be noted that the opening and closing of the contacts ARa serves to change the energization of the motor means by which the table is driven. The expression "motor means" is intended to include not only the motor 14 but also the gear box or transmission 16 through which the motor 14 drives. While motors of varying speeds and transmissions of varying gear ratios may be utilized, one working embodiment of the present invention utilized a motor 14 having high and low speed windings operable to rotate the motor at 1800 r.p.m. and 600 r.p.m., respectively. In addition, the gear box 16 was provided with high and low speed gearing having a 100 to 1 ratio. In such working embodiment, the rate of movement of the table in "fast rapid" (that is, with the solenoid and the relay TF energized) was 150 inches per minute. In "slow rapid" (with the solenoid 22 and the relay TS energized), the rate of table travel was reduced to 50 inches per minute. With the solenoid deenergized and the TF relay energized, the rate of movement of the table in "fast feed" was 1½ inches per minute. In "slow feed" with the solenoid deenergized and the relay TS energized, the rate of table movement was 1½ inch per minute. From the foregoing, it will be seen that the amount of overrun or overtravel of the table upon final positioning of the table at a rate of ½ inch per minute will be so slight as to be negligible. Furthermore, in view of the fact that the final positioning is always made in the same direction, any overrun or error which is experienced is always of the same amount and therefore the repeat accuracy of the machine will be extremely high.

Thus far, there has been described a positioning cycle involving the movement of the table in either a forward or reverse direction from either zero or from one positive dimensional setting to another positive position. However, the system of the present invention also permits positioning the table at a negative dimensional position from the selected reference point. For this purpose, the coarse positioning knob 105 is rotated to reversely drive the positive coarse counter 167. When the counter 167 is rotated through zero in the reverse direction, its shutter 181 will be actuated to cover the counter 167. Simultaneously, the shutter 183 of the negative coarse counter 169 will retract to expose the numbers presented by the negative counter 169. Upon continued rotation of the knob 105 in the same direction, the numbers of the negative counter 169 will advance from zero to 1, 2, 3, etc. The knob 105 is rotated until the digits to the left of the decimal point in the desired dimension are displayed by the coarse counter 169. To then dial in the dimensions to the right of the decimal point, the lever 95 is first manually pulled down to cause the shutter 91 to cover the positive fine counter 83 and the shutter 93 to retract and expose the negative fine counter 85. Next, the fine positioning knob 66 is manually rotated to cause the desired fractional part of the dimension to appear on the negative fine counter 85 and on the reversely numbered side of the dial 99. The system is then ready for automatic positioning by manual operation of the automatic positioning switch SW2.

In operating the lever 95 to expose the negative fine counter 85, the switch SW1 was also actuated to cause its contacts SW1b to close. By this means, the switch LS1 is selected to control the coarse positioning of the table, rather than the switch LS2. For reasons which will be explained hereafter, the switch LS1 is set to trip slightly subsequent to the operation of the switch LS2. This variation may be established by adjustment of the set screw 161. Inasmuch as the shoulders 145 and 147 are sloped, the actuating arms 151 and 153 are somewhat gradually pivoted and, by causing the switch LS1 to trip at the end of the pivot of the arm 151 while causing the switch LS2 to trip toward the beginning of the pivotal movement of its actuating arm 153, a difference in the tripping position of the cam 139 for the two switches may be established. This difference in position is such displacement of the cam as is caused by one inch of movement of the table 13.

The reasons for the use of the second switch LS1 are based upon the desirability, efficiency and economy of using a lead screw 25 which is only capable of producing one inch linear movement of the sensing head 23. In practice, the threaded portion of the lead screw 25 is approximately 1¾ inches long, which is just sufficient length to permit the nut portion 65 to travel one inch along its length. In setting the mechanism for a positive dimension, let it be assumed that the nut portion 65 is at the right-hand end of the threads of the lead screw 25, as is shown in FIG. 2. In adjusting the position of the sensing head to produce the fractional portion of a desired positive dimension, the nut portion 65 is moved in a left-hand direction on the lead screw 25. When it has been moved .9999 inch, it has achieved the full length of its useful travel. In order to dial in the fractional portion of the "negative" dimension, it would be logical to assume that the nut portion 65 should move down the threads of the lead screw 25 in a right-hand direction from the zero position. However, as will be seen in FIG. 2, there are no threads on the right-hand side of the nut portion 65 and the nut only has room for one inch of travel, rather than two full inches of travel which would be needed for an inch travel in both a positive and negative direction. It is well known that the shorter a precision lead screw is, the greater is the accuracy with which the lead screw can be manufactured. Furthermore, by using the short lead screw, the maximum adjustment which must be made of the head is only one inch, whereas if a two inch travel lead screw were used, the head would have to be adjusted almost two full inches in going from a high positive fractional dimension to a high negative fractional dimension. The necessity of moving such a long distance in adjusting the head 23 would materially detract from the ease with which the desired dimensions may be established. Further, excessive travel of the nut 65 on the threads would, over a period of time, produce wear on the threads. For this reason, the use of a short lead screw capable of producing only one inch of travel has been found highly expedient.

To use a short lead screw in the present system, it is assumed that the zero adjusted position of the head exists when the nut portion 65 is at the left-hand end of the lead screw when dialing in negative dimensions. Because of the geared relationship of the fine counters 85 and 83 and the indicia of the dial 99, the negative fine counter 85 together with the indicia on one side of the dial 99 will at all times display a number in its window which indicates the position of the nut portion 65 from the left-hand end of the lead screw 25, while the positive counter 85 together with the indicia on the other side of the dial 99 will display a number indicating the position of the nut from the right-hand end of the lead screw Let it be assumed that the desired negative dimension is 4.7525 inches. In dialing in this dimension, the negative coarse counter 169 is set at four and the knob 66 is then rotated until seventy-five appears on the counter 85 and twenty-five appears on the negative side of the dial 99. In the course of making such settings, the cam 139 will first have been displaced an angular amount corresponding to four inches of table travel. When the fine setting is put in, the cam will have been rotated slightly back toward the shoulder an amount corresponding to .2475 inch of travel. This means that if the same switch LS1 were utilized, the cam would trip the switch after only 3.7525 inches of table travel, and the head would be centered on the pin next adjacent to the one on which it should be centered. This situation is corrected by utilizing the second switch LS1, which is set to trip after another full inch of travel. In other words, the difference in the setting of the switch LS1 compensates for the one inch transposition of the zero point in the adjusted position of the sensing head in making a negative setting.

The operation of the control circuitry for a negative dimension is identical to that involved in a positive dimension except that the switch LS1 is used instead of LS2 by virtue of the fact that contacts SW1a are open and SW1b are closed. When the table rests at a positive dimensional position or in the zero position and a negative dimension is dialed in, or if the table rests in one negative position and another higher negative position is dialed in, the displacement of the cam 139 will be in a direction to hold the contacts LS1b closed and the contacts LS1a open. Thus, the table will initially move to the right and the complete sequence of movements illustrated in FIG. 7 will be followed. However, if a lesser negative amount is established than the one in which the table rests, then the opposite side of the cam 139 will engage the roller 155 and the contacts LS1a will be closed and contacts LS1b open so that the table will initially move to the left and the cycle will be of the abbreviated type first described and the movement indicated by the first horizontal line of FIG. 7 will be omitted.

In practice, it has been found that the system of the present invention is accurate to the degree of reading of the system; that is, within one ten-thousandth of an inch. By the accurate machining of the inserts 21 and their correct placement in the bar 19, the sensing head 23 is capable of detecting the center line of the inserts with great sensitivity.

From the foregoing, it will be seen that the present invention provides a positioning control system which may be rapidly and conveniently set up and adjusted by a machine tool operator by direct reading of blueprint dimensions. Once the system has been set up for a given workpiece, the movement of the table 13 to successive positions may be controlled merely by rotating the knobs 66 and 105 to change the setting on the counters on the dial 99, and it is not necessary to retract the table to a beginning position prior to each automatic positioning cycle. The construction of the system is such that the table is always driven in the proper direction to approach the dimension "dialed in," no matter what its previous position may be. Additionally, it will be appreciated by those skilled in the art that the present system may be built at a cost far less than many other positioning control systems which are presently commercially available.

While it will be apparent that the preferred embodiment herein illustrated is well calculated to fulfill the objects above stated, it will be appreciated that the invention is susceptible to modification, variation and change without departing from the proper scope or fair meaning of the subjoined claims.

What is claimed is:

1. In a machine having a base member, a supporting member movable in opposite directions on said base member, and a motor for moving said supporting member, the combination which includes a plurality of linearly spaced reference portions on one of said members, a sensing element on the other of said members in a position to sense and respond to said reference portions successively upon movement of said supporting member, means including said sensing element for controlling the energization of said motor, switch mechanism operable to disable said sensing element from controlling said motor during a preliminary movement of said supporting member, said switch mechanism including a movable element which when moved to one position renders said sensing element effective to control the energization of the motor, means for driving said movable element in accordance with the movement of said supporting member, and means for selectively prepositioning said movable element away from said one position by an amount sufficient to delay the actuation of said switch mechanism and thus delay establishing the effectiveness of said sensing element until said supporting member has moved to a position in which a predetermined one of said reference portions is in near operative relation to said sensing element.

2. In a machine having a base member, a supporting member movable in opposite directions on said base member, and a motor for moving said supporting member, the combination which includes a plurality of linearly spaced reference portions on one of said members, a sensing element adjustably mounted on the other of said members in a position to sense and respond to said reference portions successively upon movement of said supporting member, means including said sensing element for controlling the energization of said motor, switch mechanism operable to disable said sensing element from controlling said motor during a preliminary movement of said supporting member, said switch mechanism including a movable element which when moved to one position renders said sensing element effective to control the energization of the motor, means for driving said movable element in accordance with the movement of said supporting member, and means for selectively pre-positioning said movable element away from said one position by an amount sufficient to delay the actuation of said switch mechanism and thus delay establishing the effectiveness of said sensing element until said supporting member has moved to a position in which a predetermined one of said reference portions is in near operative relation to said sensing element.

3. The structure set forth in claim 2, including fine position indicating means responsive to the adjustment of said sensing element, and coarse position indicating means responsive to said means for selectively pre-positioning said movable element.

4. In a machine having a base member, a supporting member movable in opposite directions on said base member, and a motor for moving said supporting member, the combination which includes a plurality of linearly spaced reference portions on one of said members, a sensing element on the other of said members in a position to sense and respond to said reference portions successively upon movement of said supporting member, means including said sensing element for controlling the energization of said motor, switch mechanism operable to disable said sensing element from controlling said motor during a preliminary movement of said supporting member, said switch mechanism including a movable element which when moved to one position renders said sensing element effective to control the energization of the motor, means for driving said movable element in accordance with the movement of said supporting member, and movable pre-setting means for said movable element for differentially driving said movable element by and between said pre-setting means and said supporting member, whereby said movable element may be initially displaced from said one position by movement of said pre-setting means and said movable element will be moved back toward said one position by movement of said supporting member.

5. The structure set forth in claim 4, including a mechanical counter for displaying the approximate position of said supporting member at which said movable element will be moved to said one position.

6. The structure set forth in claim 4, in which the means for driving said movable element in accordance with the movement of said supporting member includes a rack on said supporting member and a pinion engageable with said rack and adapted to be rotated by movement of said supporting member.

7. In a machine having a base member, a supporting member movable on said base member, and motor means for moving said supporting member, the combination which includes a plurality of linearly spaced reference portions on one of said members, an adjustable element mounted on the other of said members and adjustable in a direction parallel to said reference portions, a sensing element carried by said adjustable member in a position to sense and respond to said reference portions successively upon movement of said supporting member, means including said sensing element for controlling the energization of said motor, switch mechanism operable to disable said sensing element from controlling said motor during a preliminary movement of said supporting member, said switch mechanism including a movable element which when moved to one position renders said sensing element effective to control the energization of the motor, an angularly driven element on said adjustable member driven by relative movement between said adjustable member and the member on which said reference portions are located, and movable pre-setting means for selectively pre-positioning said movable element away from said one position by an amount sufficient to delay the actuation of said switch mechanism and thus delay establishing the effectiveness of said sensing element until said supporting member has moved to a position in which a predetermined one of said reference portions is in near operative relation to said sensing element, and a differential drive mechanism for differentially driving said movable element by and between said pre-setting means and said angularly driven member.

8. In a machine having a base member, a supporting member movable on said base member, and motor means for moving said supporting member in either of two opposite directions, a plurality of linearly spaced reference portions on one of said members, a sensing element mounted on the other of said members in a position to sense and respond to said reference portions successively upon movement of said supporting member, a control circuit responsive to said sensing element for controlling the energization of the motor means and effective to change the energization of the motor means when the sensing element is moved to a predetermined position relative to any one of said reference portions, switch means rendering said sensing element ineffective to control said control circuit during a preliminary movement of the supporting member, a movable cam for controlling the operation of said switch means and effective to restore control of the control circuit to the sensing element when the cam is in one position, means for moving the cam in one direction in accordance with the movement of the supporting member in a given direction, and means for pre-setting the cam in a direction opposite to said one direction to a position spaced from said one position by an amount sufficient to cause the cam to return to said one position incident to movement of the supporting member in said given direction when the sensing element is in near operative relation to a predetermined reference portion.

9. In a machine having a base member, a supporting member movable on said base member, and motor means for moving said supporting member in either of two opposite directions, a plurality of linearly spaced reference portions on one of said members, a sensing element mounted on the other of said members operable to detect the movement of any one of said reference portions to a predetermined position relative thereto, a motor control circuit including switch means for energizing the motor means in either direction, movable cam means for actuating said switch means when in a given position, said switch means being held in a position energizing said motor means in one direction when said cam means is displaced in one direction from said position and said switch means being held in a position energizing said motor means in the opposite direction when said cam means is displaced in the opposite direction from said position, means for pre-setting said cam means a predetermined amount in either direction from said position, means for moving said cam means back toward said position in accordance with the movement of said supporting member whereby said switch means will be actuated when said sensing element is approximately in said predetermined position relative to a selected one of said reference portions, and means responsive to the actuation of said switch means to place said sensing element in control of the energization of said motor means.

10. In a machine having a base member, a supporting member movable on said base member, and motor means for moving said supporting member in either of two opposite directions, a plurality of linearly spaced reference portions on one of said members, a sensing element mounted on the other of said members in a position to sense and respond to said reference portions successively upon movement of said supporting member, a control circuit responsive to said sensing element for controlling the energization of said motor means and effective to change the energization of said motor means when the sensing element is moved to a predetermined position relative to any one of said reference portions, switch means rendering said sensing element ineffective to control said control circuit during a preliminary movement of said supporting member in response to energization of said motor means, movable cam means for operating said switch means when in a given position and thereby restore control of the control circuit to said sensing element, movable pre-setting means for said cam means for differentially driving said cam by and between said pre-setting means and said supporting member whereby said cam means may be initially displaced from said position by movement of said pre-setting means and said cam will be moved back toward said position by movement of said supporting member, and visual indicating means driven by said pre-setting means for displaying the approximate position of said supporting member at which said cam means will act with said switch means.

11. In a machine having a base member, a supporting member movable on said base member, and motor means for moving said supporting member in a given direction, a plurality of equally spaced linearly arranged reference portions on one of said members, an adjustable member on the other of said members movable on said other member in a direction parallel to said reference portions, a sensing element carried by said adjustable element in a position to sense and respond to said reference portions successively upon movement of said supporting member, a rotary element carried by said adjustable element, means carried by said one member having a driving connection with said rotary element for rotating said rotary element upon relative movement between said one member and said adjustable element, a control circuit responsive to said sensing element for controlling the energization of said motor means and effective to change the energization of the motor element when the sensing element is moved to a predetermined position relative to any one of said reference portions, switch means for rendering said sensing element ineffective to control said control circuit during the preliminary movement of the supporting member, movable cam means for actuating said switch means and effective to restore control of the control circuit to the sensing head when said cam means is in a given position, rotatably operative pre-setting means for said cam means, means for differentially driving said cam means by and between said pre-setting means and said rotatable element whereby said cam means may be initially displaced from said position by rotation of said pre-setting means and by movement of said adjustable member whereby said cam will be moved back toward said position by movement of said supporting member to actuate said switch means when said sensing element is approximately in said predetermined position relative to a selected one of said reference portions.

12. In a machine having a base member, a supporting member movable on said base member, and motor means for moving said supporting member in a given direction, a plurality of equally spaced linearly arranged reference portions on one of said members, an adjustable member on the other of said members movable on said other member in a direction parallel to said reference portions, a sensing element carried by said adjustable element in a position to sense and respond to said reference portions successively upon movement of said supporting member, a rack mounted on said one member, a pinion carried by said adjustable element and engageable with said rack for rotation upon relative movement of said adjustable element and said one member, a control circuit responsive to said sensing element for controlling the energization of said motor means and effective to change the energization of the motor element when the sensing element is moved to a predetermined position relative to any one of said reference portions, switch means for rendering said sensing element ineffective to control said control circuit during the preliminary movement of the supporting member, movable cam means for actuating said switch means and effective to restore control of the control circuit to the sensing head when said cam means is in a given position, rotatably operative pre-setting means for said cam means, means for differentially driving said cam means by and between said pre-setting means and said pinion whereby said cam means may be initially displaced from said position by rotation of said pre-setting means and by movement of said adjustable member whereby said cam will be moved back toward said position by movement of said supporting member to actuate said switch means when said sensing element is approximately in said predetermined position relative to a selected one of said reference portions.

13. In a machine having a base member, a supporting member movable on said base member, and motor means for moving said supporting member in either of two opposite directions, a plurality of equally spaced laterally arranged reference portions on one of said members, a precision lead screw journaled on the other of said members for rotation about an axis parallel to said reference portions, a reciprocating element having a threaded driving engagement with said lead screw capable of movement under the influence of the lead screw for a distance at least equal to the spacing of said reference portions, indicating means driven by said lead screw for indicating the displacement of said element from a position in which the indicating means gives a zero reading, a sensing element on said adjustable element for movement relative to the element and parallel to the lead screw, said sensing element being operable to sense the presence of any one of said reference portions in a predetermined position relative thereto, means for adjustably positioning said sensing head in any desired location on said adjustable element in order to position said sensing element in a predetermined position relative to one of said reference portions when said indicating means gives a zero reading, and means controlled in part by said sensing element for deenergizing said motor means when said sensing element is moved to said predetermined position relative to a predetermined reference portion.

14. In a machine having a base member, a supporting member movable on said base member, and motor means for moving said supporting member in either of two opposite directions, a plurality of equally spaced laterally arranged reference portions on one of said members, a precision lead screw journaled on the other of said members for rotation about an axis parallel to said reference portions, a reciprocating element having a threaded driving engagement with said lead screw capable of movement under the influence of the lead screw for a distance at least equal to the spacing of said reference portions, indicating means driven by said lead screw for indicating the displacement of said element from a position in which the indicating means gives a zero reading, a sensing element on said adjustable element for movement relative to the element and parallel to the lead screw, said sensing element being operable to sense and respond to said reference portions successively upon movement of said supporting member, means for adjustably positioning said sensing head in any desired location on said adjustable element in order to position said sensing element in juxtaposition to one of said reference portions when said indicating means gives a zero reading, a visual signal actuated by said sensing element for indicating when the sensing element is in proper juxtaposition to one of said reference portions, and means controlled in part by said sensing element for changing the energization of said motor means when said sensing element is relatively moved into juxtaposition to a predetermined reference portion.

15. In a machine having a base member, a supporting member movable on said base member, and motor means for moving said supporting member in either of two opposite directions, a plurality of linearly spaced reference portions on one of said members, a sensing element mounted on the other of said members in a position to sense and respond to said reference portions successively upon movement of said supporting member, a coarse control means for energizing said motor means including a switch, said coarse control means being operable to energize said motor means in one direction when said switch is held in a first position and being operable to energize said motor means in the opposite direction when said switch is held in a second position, a fine control means responsive to said sensing element for controlling the energization of said motor means and effective to change the energization of said motor means when the sensing element is moved to a predetermined position relative to any one of said reference portions, said fine control circuit being disabled during energization of said motor means by said coarse control means, a rotatable cam having two peripheral portions of different radii and a shoulder intermediate said portions, a cam follower for said cam operably connected to said switch so that said switch will be held in its first position when said cam follower engages one peripheral cam portion and said switch will be held in its second position when said cam follower engages the other peripheral cam portion, means for pre-setting said cam to displace said shoulder a selected amount in either direction from said cam follower, means for rotating said cam shoulder back toward said cam follower in accordance with the movement of said supporting member whereby said switch means will be actuated when said sensing element is in near operative position relative to one of said reference portions selected by the amount of preset displacement of said cam, and means responsive to the actuation of said switch for enabling said fine control means.

16. In a machine having a base member, a supporting member movable on said base member, and motor means for moving said supporting member in either of two opposite directions, a plurality of equally spaced linearly arranged reference portions on one of said members, a precision lead screw journaled on the other of said members for rotation about an axis parallel to said reference portions, a reciprocating element having a threaded driving engagement with said lead screw capable of movement under the influence of the lead screw for a distance at least equal to the spacing of said reference portions, indicating means driven by said lead screw for indicating the displacement of said element from a position in which the indicating means gives a zero reading, a sensing element on said adjustable element for movement relative to the element and parallel to the lead screw, said sensing element being operable to sense and respond to said reference portions successively upon movement of said supporting member, means for adjustably positioning said sensing head in any desired location on said adjustable element in order to position said sensing element in a predetermined position relative to one of said reference portions when said indicating means gives a zero reading, a control circuit responsive to said sensing element for controlling the energization of said motor means and effective to change the energization of said motor means when the sensing element is moved to said predetermined position relative to one of said reference portions, switch means rendering said sensing element ineffective to control said control circuit during a preliminary movement of the supporting member, a movable cam for controlling the operation of said switch means and effective to restore control of the control circuit to the sensing means when the cam is in one position, movable pre-setting means for said cam, a rotary element carried by said reciprocating element, means on said other member for rotating said rotary element upon relative movement of said reciprocating element and said other member, means for differentially driving said cam by and between said pre-setting means and said rotary element whereby said cam may be initially displaced from said position by movement of said pre-setting means and rotation of said lead screw, and said cam will be moved back toward said position by movement of said supporting member.

17. In a machine having a base member, a supporting member movable on said base member, and motor means for moving said supporting member in either of two opposite directions from a selected reference position, a plurality of equally spaced linearly arranged reference portions on one of said members, a lead screw journaled on the other of said members for rotation about an axis parallel to said reference portions, a sensing element on said other member movable by said lead screw from a position opposite one of said reference portions to a position opposite a next adjacent reference portion when said supporting member is in the reference position, said sensing element being operable to sense and respond to said reference portions successively upon movement of said supporting member, indicating means driven in accordance with the rotation of said lead screw and having a pair of alternatively readable media for displaying the displacement of said sensing element from each of the reference portions between which it is movable, a control circuit responsive to said sensing element for controlling the energization of said motor means and effective to change the energization of said motor means when said sensing element is moved to a predetermined position relative to any one of said reference portions, means for rendering said sensing element ineffective to control said motor means during a preliminary movement of the supporting member, a pair of switches alternatively operable to restore control of said control circuit to said sensing head upon the actuation thereof, movable cam means operable to actuate one of said switches when in one position and the other of said switches when in another position, means for moving said cam means in a direction and in magnitude corresponding to the movement of said supporting member, means for pre-setting said cam means to a position spaced from said positions, the difference between said one cam position and said other cam position being equal to such movement of the cam as is effected by a movement of the supporting member equal to the spacing between said reference portions, one of said switches being usable in controlling the movement of said supporting member in one direction from the selected reference position, the other of said switches being usable in controlling movement of the supporting member in the opposite direction from the selected reference position.

18. In a machine having a base member, a supporting member, and motor means for moving said supporting member in either of two opposite directions from a selected reference position, a plurality of equally spaced lineary arranged reference portions on one of said members, a lead screw journaled on the other of said members for rotation about an axis parallel to said reference portions, a reciprocating element having a threaded driving engagement with said lead screw, a sensing element carried by said reciprocating element operable to sense and respond to said sensing portions successively upon movement of said supporting member, said sensing element being movable by rotation of said lead screw from a first position opposite one of said reference portions to a second position opposite the next adjacent of said reference portions when said supporting member is in its reference position, indicating means driven in accordance with the rotation of said lead screw for displaying the displacement of said sensing element from said first and second positions, a rotatable element carried by said reciprocating element and means on said one member for rotating said rotatable element upon relative movement between said reciprocating element and said one member, a control circuit responsive to said sensing element for controlling the energization of said motor means and effective to change the energization of said motor means when said sensing element is moved to a predetermined position relative to any one of said reference portions, means for rendering said sensing element ineffective to control said motor means during a preliminary movement of the supporting member, a pair of switches alternatively operable to restore control of said control circuit to said sensing element upon the actuation thereof, means for selectively disabling one of said switches, movable cam means operable to actuate one of said switches when in one position and the other of said switches when in another position, means for moving said cam means in a direction and in a magnitude corresponding to the movement of said supporting member, the difference between said one cam position and said other cam position being equal to such movement of the cam as is effected by movement of the supporting member a distance equal to the spacing between said reference portions, movable pre-setting means for said cam, means for differentially driving said cam by and between said pre-setting means and said rotatable element, and visual indicating means driven by said pre-setting means for indicating the approximate position of said supporting member at which said cam means will actuate the selected one of said switches.

19. In a machine having a base member, a supporting member movable on said base member, and motor means for moving said supporting member in either of two opposite directions, a plurality of equally spaced linearly arranged reference portions on one of said members, a lead screw journaled on the other of said members for rotation about an axis parallel to said reference portions, a sensing element on said other member movable by said lead screw a distance at least equal to the spacing between said reference portions, said sensing element being operable to sense and respond to said reference portions successively upon movement of said supporting member, a multi-wheeled mechanical counter driven in accordance with the rotation of said lead screw for displaying the position of said sensing element relative to a position in which said counter reads zero, a control circuit responsive to said sensing element for controlling the energization of said motor means, means rendering said sensing element ineffective to control said motor means during a preliminary movement of the supporting means, switch means operable to restore control of the control circuit to the sensing element, movable cam means for actuating said switch means when in a given position, means for moving said cam means in a direction and magnitude corresponding to movement of said supporting member, means for pre-setting said cam from said position an amount sufficient to cause the cam to return to said position incident to movement of the supporting member when the sensing element is in near operative relation to a selected reference portion, and a mechanical counter driven by said pre-setting means for indicating the number of said selected reference portion from a predetermined reference position.

No references cited.

UNITED STATES PATENT OFFICE
CERTIFICATE OF CORRECTION

Patent No. 3,011,113                          November 28, 1961

Richard A. Jerue et al.

It is hereby certified that error appears in the above numbered patent requiring correction and that the said Letters Patent should read as corrected below.

Column 6, line 70, for "a" read -- at --; line 71, for "position", first occurrence, read -- positive --; column 9, line 53, for "matching" read -- machining --; column 10, line 25, for "dimensions" read -- dimension --; column 13, line 20, for "TDd" read -- TRd --; line 53, after "energization" insert -- of --; column 15, line 16, for "1½" read -- ½ --.

Signed and sealed this 11th day of September 1962.

(SEAL)
Attest:

ERNEST W. SWIDER                                DAVID L. LADD
Attesting Officer                                    Commissioner of Patents